United States Patent [19]

Bauer et al.

[11] 4,385,549

[45] May 31, 1983

[54] AUTOMOBILE VENTILATING APPARATUS

[75] Inventors: Andreas Bauer; Dieter Protze, both of Wolfsburg, Fed. Rep. of Germany

[73] Assignee: Volkswagenwerk Aktiengessellschaft, Wolfsburg, Fed. Rep. of Germany

[21] Appl. No.: 273,613

[22] Filed: Jun. 15, 1981

[30] Foreign Application Priority Data

Jul. 2, 1980 [DE] Fed. Rep. of Germany ....... 3024988

[51] Int. Cl.³ .............................................. B60H 1/28
[52] U.S. Cl. .......................................................... 98/2
[58] Field of Search .......................... 98/2, 2.05, 2.06; 180/69 R, 69 C; 296/1 S

[56] References Cited

U.S. PATENT DOCUMENTS 1,536,340  5/1925  Hammerl ................................. 98/2
2,391,408 12/1945  Galamb et al. ........................... 98/2
2,888,274  5/1959  Premo ................................... 98/2 X

FOREIGN PATENT DOCUMENTS 1924014 11/1970 Fed. Rep. of Germany ............ 98/2
1582440  1/1981 United Kingdom ..................... 98/2

Primary Examiner—Albert J. Makay
Assistant Examiner—Harold Joyce
Attorney, Agent, or Firm—Brumbaugh, Graves, Donohue & Raymond

[57] ABSTRACT

A ventilating device for an automobile is provided in combination with the hood and the front fenders. An air inlet gap is disposed between the hood and the fender on each side of the automobile and extends laterally therealong. Conduits are disposed above the wheel arches of the automobile and support the hood. Air inlet openings in the conduits provide fluid communication with the air gaps. A transverse conduit joins the lateral conduits and is connected to air outlets disposed in the dashboard in the passenger compartment.

6 Claims, 5 Drawing Figures

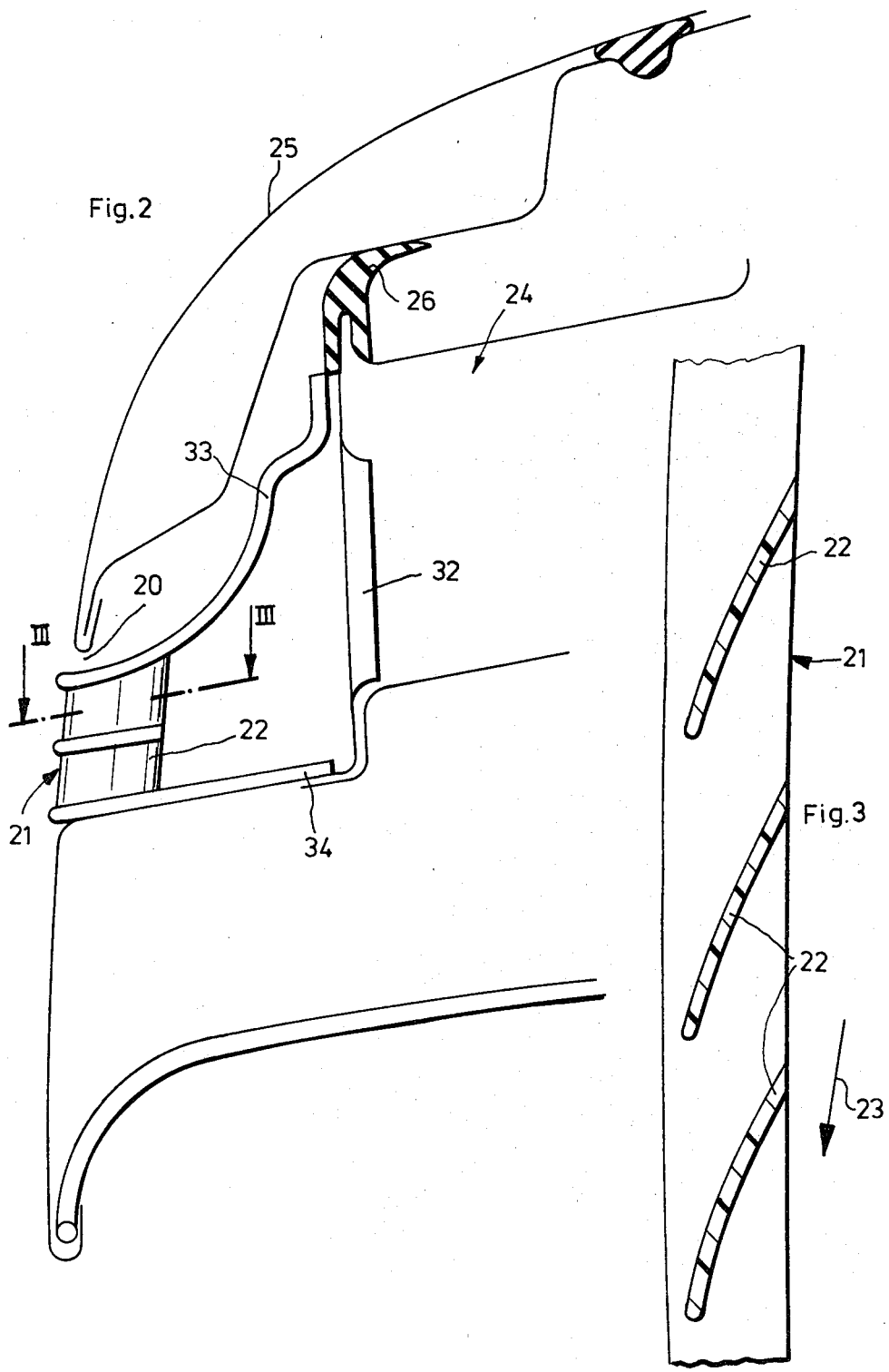

AUTOMOBILE VENTILATING APPARATUS

BACKGROUND OF THE INVENTION

This invention relates to ventilating apparatus, and more particularly, to a ventilating apparatus for automobiles which directs air flowing through gaps between the hood and the fenders of the automobile into the passenger compartment.

Wind tunnel measurements have shown that air inlet openings on the front of a vehicle have a detrimental effect on air resistance. Thus, air inlet openings should not be located on the front side of the vehicle in order to save fuel.

In German Pat. No. 935,296,63C,74, a ventilating apparatus is disclosed for a vehicle in which the front portion is a luggage compartment. Air inlet gaps are formed along the separation joint, by suitable shaping, between the hood and the fenders and between the rear edge of the hood and the portion of the vehicle located in front of the windshield (hereinafter referred to as the splash-shield). Air from the conduits is conducted into the interior of the vehicle, preferably through windshield posts, into the space between the roof of the vehicle and the headliner.

U.S. Pat. No. 2,687,326, discloses hollow beams or conduits which extend on the sides of a vehicle immediately adjacent the wheel arches and which conduct air into the passenger compartment of the vehicle.

U.S. Pat. No. 73,204 issued in the Protectorate of Bohemia and Moravia discloses a device in which air from air inlet openings disposed in the wheel arches is conducted through conduits into the passenger compartment of a vehicle. However, there is a significant risk that air mixed with water or other contaminants will flow into the interior of the vehicle.

Accordingly, one object of the present invention is to provide a ventilating apparatus which does not increase the air resistance of the vehicle, i.e., increasing the $C_w$ value, yet providing sufficient air delivery to the passenger compartment of the vehicle without contaminating the air. Another object of the present invention is to provide a ventilating apparatus which is effective when air flows on only one side of the vehicle.

An advantage of the present invention is that the air conduits positioned in a vehicle may also be utilized as reinforcing members in the vehicle. Special elements are thus not required for the ventilating device of the present invention. The lateral conduits not only guide the air into the passenger compartment of the vehicle but also can be utilized to control energy transfers when a collision occurs.

BRIEF DESCRIPTION OF THE DRAWINGS

A more complete understanding of the present invention and its advantages will be apparent from the following Detailed Description taken in conjunction with the accompanying drawings in which:

FIG. 2 is a cross section of the right-hand arch of an automobile showing an alternate embodiment of the present invention;

FIG. 3 is a sectional view taken along the lines III—III of FIG. 2;

DETAILED DESCRIPTION

Figure 1:
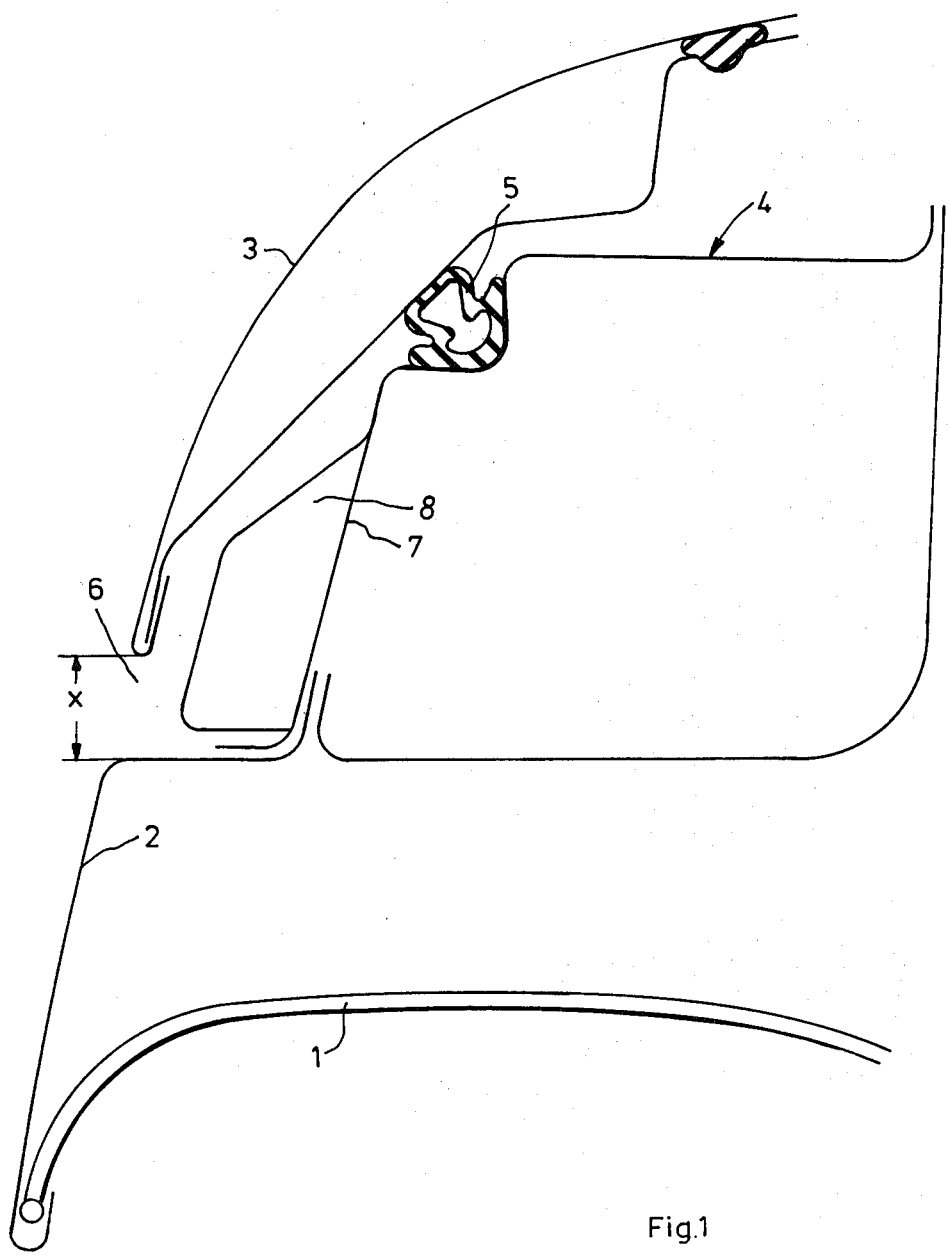
FIG. 1 is a cross-section of the right-hand wheel arch of an automobile as seen towards the rear of the vehicle and showing one embodiment of the present invention.

In FIG. 1, the wheel arch 1 has positioned above it a fender 2. A longitudinally extending lateral conduit 4 is provided in combination with a hood 3, for example, the engine hood, and a seal 5. A relatively wide lateral air inlet gap 6 of width X, determined for the required air flow, is created along the separation joint between the hood 3 and the fender 2.

The conduit 4 is disposed facing the air inlet gap 6, on the left side of FIG. 1, and is in fluid communication with air inlet openings 7. Air guide vanes 8 extending outwardly and inclining in the direction of travel of the automobile are associated with the air inlet openings 7. Thus, the lateral conduit 4 collects fresh air delivered through the laterally disposed air inlet gaps 6 and conveys it to a hollow transverse conduit 29, more fully described with reference to FIGS. 4 and 5. The transverse conduit 29 joins the laterally disposed conduits 4 which are positioned on each side of the vehicle. The transverse conduit 29 is disposed adjacent the splash-shield of the automobile and is connected with air inlets to the passenger compartment of the vehicle. In a preferred embodiment, a fan is provided to force air into the vehicle.

Referring to FIGS. 2 and 3, an intermediate element 21 is disposed in a hood separation joint adjacent the air inlet gaps 20. The intermediate element 21 may be formed as an ornamental molding element or an air guide grid. Air guide vanes 22 are associated with the intermediate element 21. As illustrated most clearly in FIG. 3, the air guide vanes 22 guide the air into the lateral conduit 24 when the vehicle travels in the direction indicated by the arrow 23.

Each lateral conduit 24, with one conduit disposed on each side of the vehicle, is positioned underneath the hood 25 so that it forms a good support for the hood 25. A lip seal 26 provides a tight fit between the conduit 24 and the hood 25. As will be evident to those of skill in the art, the seal 26 could also be attached to the hood 25 rather than the lateral conduit 24. In a preferred embodiment, the seal 26 is disposed close to the air inlet gap.

In the embodiment of FIG. 2, the air inlet gaps 20 (of which FIG. 2 illustrates only one gap) are disposed on both sides of the vehicle and not on the front. Accordingly, an undesirable increase in the air resistance, $C_w$, is obviated.

In FIG. 2, the air inlet openings 32 in the lateral conduit 24 are disposed somewhat above the air inlet gaps in the intermediate element 21. This arrangement makes it more difficult for water to enter the lateral conduit, which is naturally undesirable.

The intermediate element 21 is tightly connected with the outer wall of the lateral conduit 24 with flanges 33 and 34. A seal (not shown) may be attached to the hood 25 at the upper flange 33 in the zone of the curvature of the flange to firmly seal the hood 25.

Figure 4:
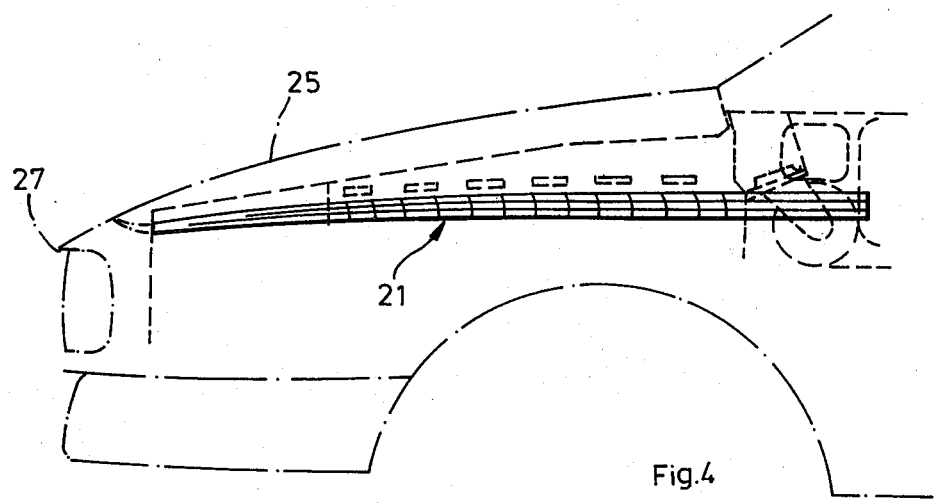
FIG. 4 is a schematic side view of the front portion of an automobile.
Figure 5:
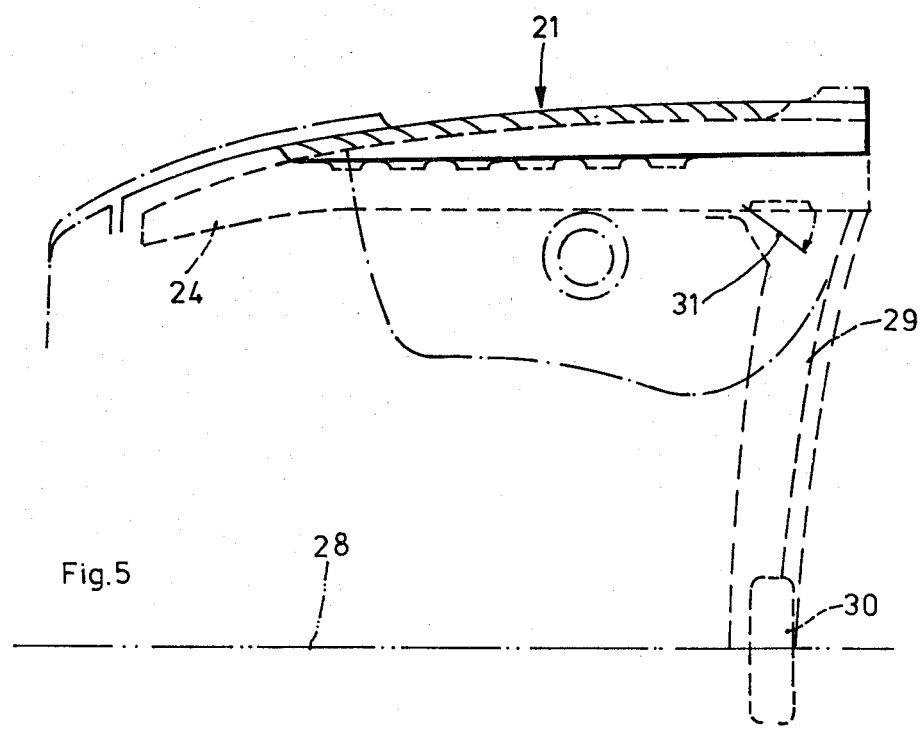
FIG. 5 is a plan view of the front portion of a vehicle constructed in accord with FIGS. 2 and 3.

With reference to FIGS. 4 and 5, the ornamental molding intermediate element 21 decreases in height as it approaches the front 27 of the vehicle. At the front 27 of the vehicle, a tight closure exists between the hood 25 and the vehicle body. In FIG. 5, the lateral conduit 24 opens into a common transverse conduit 29 which is disposed in the vicinity of the splash-shield of the vehicle. Although not illustrated in FIG. 5, an analogous lateral conduit 24 is disposed on the other side of the vehicle. (The vehicle center line is indicated by the dashed line 28). The transverse conduit 29 may include a fan 30 for forcing air into the interior of the vehicle. The transverse conduit 29 is in fluid communication with air outlets in the interior of the vehicle.

Check flaps 31 are provided where the lateral conduit 24 joins the transverse conduit 29. The flaps 31 are provided so that a flap on the leeward side closes when air flows laterally onto the vehicle.

The use of a transverse conduit 29 providing fluid communication between the lateral conduits 24 insures an effective ventilating arrangement, even when air flows laterally across the vehicle. Under these conditions, a differential flow of air is produced within the transverse conduit.

While more than one embodiment of the present invention has been described in detail herein and disclosed in accompanying drawings, various further modifications may be made without departing from the spirit and scope of the invention.

We claim:

1. In an automobile with a hood and front fenders enclosing wheel arches and a separation joint between said hood and fenders, a device for ventilating the passenger compartment of said automobile comprising:

an air inlet gap disposed between said hood and said fender on each side of said automobile and extending laterally along said separation joint;

air conduits laterally disposed above the wheel arches of said automobile, and having air inlet openings providing fluid communication with said air gaps, said conduits being arranged to support said hood; and a transverse conduit joining said lateral conduits with air outlets in said passenger compartment.

2. The device of claim 1 and further comprising air guide vanes extending outwardly in said air gaps and inclining in the direction of travel of said automobile to guide air to said air inlet openings of said lateral conduits.

3. The device in claims 1 or 2 wherein the cross-section of said lateral conduits increases in the direction towards said transverse conduit.

4. The device in claim 1 and further comprising an intermediate element disposed in said separation joint and including air guide vanes.

5. The device in claim 4 and further comprising upper and lower flanges tightly connecting said intermediate element to said lateral conduit.

6. The device in claim 1 and further comprising check valves disposed between said lateral conduits and said transverse conduit.

* * * * *